United States Patent
Flores et al.

(10) Patent No.: US 6,889,311 B2
(45) Date of Patent: May 3, 2005

(54) PIPELINE STAGE SINGLE CYCLE SLIDING ALIGNMENT CORRECTION OF MEMORY READ DATA WITH INTEGRATED DATA REORDERING FOR LOAD AND STORE INSTRUCTIONS

(75) Inventors: Jose L. Flores, Richardson, TX (US); Lewis Nardini, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 262 days.

(21) Appl. No.: 10/302,084

(22) Filed: Nov. 22, 2002

(65) Prior Publication Data

US 2004/0103256 A1 May 27, 2004

(51) Int. Cl.[7] .................................................. G06F 9/00
(52) U.S. Cl. ....................... 712/204; 712/219; 712/300; 714/45; 714/17; 703/26; 713/401; 713/503; 711/201
(58) Field of Search ................................. 712/204, 300, 712/219, 225, 226; 714/45, 17, 28, 30; 703/23, 26; 713/401, 503; 711/5, 154, 169, 201

(56) References Cited

U.S. PATENT DOCUMENTS

| | | | | |
|---|---|---|---|---|
| 5,625,787 A | * | 4/1997 | Mahin et al. ................ 712/204 |
| 5,838,692 A | * | 11/1998 | Tobin .......................... 714/724 |
| 5,867,644 A | * | 2/1999 | Ranson et al. ................. 714/39 |
| 5,867,690 A | * | 2/1999 | Lee et al. ...................... 710/65 |
| 5,944,841 A | * | 8/1999 | Christie ........................ 714/38 |
| 5,948,099 A | * | 9/1999 | Crawford et al. ............ 712/225 |
| 5,964,863 A | * | 10/1999 | Liu et al. ....................... 712/32 |
| 6,035,422 A | * | 3/2000 | Hohl et al. .................... 714/35 |
| 6,081,885 A | * | 6/2000 | Deao et al. .................. 712/227 |
| 6,106,573 A | * | 8/2000 | Mahalingaiah et al. ..... 717/128 |
| 6,189,140 B1 | * | 2/2001 | Madduri ...................... 717/128 |
| 6,219,773 B1 | * | 4/2001 | Garibay et al. ............. 711/201 |
| 6,247,119 B1 | * | 6/2001 | Matt .......................... 712/228 |
| 6,446,249 B1 | * | 9/2002 | Wang et al. ................... 716/17 |
| 6,763,385 B1 | * | 7/2004 | Orfali ......................... 709/224 |

* cited by examiner

*Primary Examiner*—Hong Kim
(74) *Attorney, Agent, or Firm*—Robert D. Marshall, Jr.; W. James Brady, III; Frederick J. Telecky, Jr.

(57) ABSTRACT

Trace data is aligned in a processor having an instruction pipeline by delaying write data and read data a predetermined number of clock cycles, selectively swapping both most significant write data and read data with least significant write data and read dependent upon memory access control data. The write and read data pass normally for even memory bank accesses and are swapped for odd memory bank accesses. Memory access control data, program counter data and program counter control data are similarly delayed. At least the read data and optionally all the data are held upon a pipeline stall.

11 Claims, 5 Drawing Sheets

PIPELINE STAGE SINGLE CYCLE SLIDING ALIGNMENT CORRECTION OF MEMORY READ DATA WITH INTEGRATED DATA REORDERING FOR LOAD AND STORE INSTRUCTIONS

CROSS REFERENCE TO RELATED APPLICATIONS

This application is related to the following applications all filed on Nov. 22, 2004:

U.S. patent application Ser. No. 10/301,886 entitled TRACING USER CHANGE OF PROGRAM COUNTER DURING STOP EVENT;

U.S. patent application Ser. No. 10/301,887 entitled ADDRESS RANGE COMPARATOR FOR DETECTION OF MULTI SIZE MEMORY ACCESSES WITH DATA MATCHING QUALIFICATION AND FULL OR PARTIAL OVERLAP;

U.S. patent application Ser. No. 10/301,893 entitled MAINTAINING COHERENT SYNCHRONIZATION BETWEEN DATA STREAMS ON DETECTION OF FLOW;

U.S. patent application Ser. No. 10/301,894 entitled LITTLE OFFSET IN MULTICYCLE EVENT MAINTAINING CYCLE ACCURATE TRACING OF STOP EVENTS;

U.S. patent application Ser. No. 10/301,896 entitled EMULATION PAUSE AND RESET TRACING OF MULTIPLE SYNC POINTS POINTING TO DIFFERENT ADDRESSES;

U.S. patent application Ser. No. 10/301,897 entitled REPORTING A SATURATED COUNTER VALUE;

U.S. patent application Ser. No. 10/301,900 entitled PRECISE DETECTION OF TRIGGERS AND TRIGGER ORDERING FOR ASYNCHRONOUS EVENTS;

U.S. patent application Ser. No. 10/301,935 entitled DATA TRACE COMPRESSION MAP;

U.S. patent application Ser. No. 10/301,968 entitled DISTINGUISHING BETWEEN TWO CLASSES OF TRACE INFORMATION;

U.S. patent application Ser. No. 10/301,969 entitled PROGRESSIVE EXTENDED COMPRESSION MASK FOR DYNAMIC TRACE;

U.S. patent application Ser. No. 10/302,022 entitled STALLING CPU PIPELINE TO PREVENT CORRUPTION IN TRACE WHILE MAINTAINING COHERENCY WITH ASYNCHRONOUS EVENTS;

U.S. patent application Ser. No. 10/302,024 entitled RECOVERY FROM CORRUPTION USING EVENT OFFSET FORMAT IN DATA TRACE;

U.S. patent application Ser. No. 10/302,025 entitled TRACING PROGRAM COUNTER ADDRESSES USING NATIVE PROGRAM COUNTER FORMAT AND INSTRUCTION COUNT FORMAT;

U.S. patent application Ser. No. 10/302,026 entitled DYNAMIC DATA TRACE OUTPUT TECHNIQUE;

U.S. patent application Ser. No. 10/302,082 entitled TRACING THROUGH RESET;

U.S. patent application Ser. No. 10/302,083 entitled TRIGGER ORDERING FOR TRACE STREAMS WHEN MULTIPLE TRIGGERS ACCUMULATE;

U.S. patent application Ser. No. 10/302,189 entitled PROGRAMMABLE EXTENDED COMPRESSION MASK FOR DYNAMIC TRACE;

U.S. patent application Ser. No. 10/302,191 entitled READ FIFO SCHEDULING FOR MULTIPLE STREAMS WHILE MAINTAINING COHERENCY;

U.S. patent application Ser. No. 10/302,192 entitled PROGRAM COUNTER RANGE COMPARATOR WITH EQUALITY, GREATER THAN, LESS THAN AND NON-EQUAL DETECTION MODES;

U.S. patent application Ser. No. 10/302,193 entitled MULTI-PORT TRACE DATA HANDLING;

U.S. patent application Ser. No. 10/302,236 entitled APPARATUS FOR ALIGNMENT OF DATA COLLECTED FROM MULTIPLE PIPE STAGES WITH HETEROGENEOUS RETENTION POLICIES IN AN UNPROTECTED PIPELINE;

U.S. patent application Ser. No. 10/302,449 entitled SEPARATION OF DEBUG WINDOWS BY IDS BIT; and U.S. patent application Ser. No. 10/302,451 entitled IMPRECISE DETECTION OF TRIGGERS AND TRIGGER ORDERING FOR ASYNCHRONOUS EVENTS.

TECHNICAL FIELD OF THE INVENTION

The technical field of this invention is emulation hardware particularly for highly integrated digital signal processing systems.

BACKGROUND OF THE INVENTION

Advanced wafer lithography and surface-mount packaging technology are integrating increasingly complex functions at both the silicon and printed circuit board level of electronic design. Diminished physical access to circuits for test and emulation is an unfortunate consequence of denser designs and shrinking interconnect pitch. Designed-in testability is needed so the finished product is both controllable and observable during test and debug. Any manufacturing defect is preferably detectable during final test before a product is shipped. This basic necessity is difficult to achieve for complex designs without taking testability into account in the logic design phase so automatic test equipment can test the product.

In addition to testing for functionality and for manufacturing defects, application software development requires a similar level of simulation, observability and controllability in the system or sub-system design phase. The emulation phase of design should ensure that a system of one or more ICs (integrated circuits) functions correctly in the end equipment or application when linked with the system software. With the increasing use of ICs in the automotive industry, telecommunications, defense systems, and life support systems, thorough testing and extensive real-time debug becomes a critical need.

Functional testing, where the designer generates test vectors to ensure conformance to specification, still remains a widely used test methodology. For very large systems this method proves inadequate in providing a high level of detectable fault coverage. Automatically generated test patterns are desirable for full testability, and controllability and observability. These are key goals that span the full hierarchy of test from the system level to the transistor level.

Another problem in large designs is the long time and substantial expense involved in design for test. It would be desirable to have testability circuitry, system and methods that are consistent with a concept of design-for-reusability. In this way, subsequent devices and systems can have a low marginal design cost for testability, simulation and emulation by reusing the testability, simulation and emulation circuitry, systems and methods that are implemented in an initial device. Without a proactive testability, simulation and emulation plan, a large amount of subsequent design time would be expended on test pattern creation and upgrading.

Even if a significant investment were made to design a module to be reusable and to fully create and grade its test patterns, subsequent use of a module may bury it in application specific logic. This would make its access difficult or impossible. Consequently, it is desirable to avoid this pitfall.

The advances of IC design are accompanied by decreased internal visibility and control, reduced fault coverage and reduced ability to toggle states, more test development and verification problems, increased complexity of design simulation and continually increasing cost of CAD (computer aided design) tools. In the board design the side effects include decreased register visibility and control, complicated debug and simulation in design verification, loss of conventional emulation due to loss of physical access by packaging many circuits in one package, increased routing complexity on the board, increased costs of design tools, mixed-mode packaging, and design for produceability. In application development, some side effects are decreased visibility of states, high speed emulation difficulties, scaled time simulation, increased debugging complexity, and increased costs of emulators. Production side effects involve decreased visibility and control, complications in test vectors and models, increased test complexity, mixed-mode packaging, continually increasing costs of automatic test equipment and tighter tolerances.

Emulation technology utilizing scan based emulation and multiprocessing debug was introduced more than 10 years ago. In 1988, the change from conventional in circuit emulation to scan based emulation was motivated by design cycle time pressures and newly available space for on-chip emulation. Design cycle time pressure was created by three factors. Higher integration levels, such as increased use of on-chip memory, demand more design time. Increasing clock rates mean that emulation support logic causes increased electrical intrusiveness. More sophisticated packaging causes emulator connectivity issues. Today these same factors, with new twists, are challenging the ability of a scan based emulator to deliver the system debug facilities needed by today's complex, higher clock rate, highly integrated designs. The resulting systems are smaller, faster, and cheaper. They have higher performance and footprints that are increasingly dense. Each of these positive system trends adversely affects the observation of system activity, the key enabler for rapid system development. The effect is called "vanishing visibility."

FIG. 1 illustrates the trend in visibility and control over time and greater system integration. Application developers prefer the optimum visibility level illustrated in FIG. 1. This optimum visibility level provides visibility and control of all relevant system activity. The steady progression of integration levels and increases in clock rates steadily decrease the actual visibility and control available over time. These forces create a visibility and control gap, the difference between the optimum visibility and control level and the actual level available. Over time, this gap will widen. Application development tool vendors are striving to minimize the gap growth rate. Development tools software and associated hardware components must do more with less resources and in different ways. Tackling this ease of use challenge is amplified by these forces.

With today's highly integrated System-On-a-Chip (SOC) technology, the visibility and control gap has widened dramatically over time. Traditional debug options such as logic analyzers and partitioned prototype systems are unable to keep pace with the integration levels and ever increasing clock rates of today's systems. As integration levels increase, system buses connecting numerous sub-system components move on chip, denying traditional logic analyzers access to these buses. With limited or no significant bus visibility, tools like logic analyzers cannot be used to view system activity or provide the trigger mechanisms needed to control the system under development. A loss of control accompanies this loss in visibility, as it is difficult to control things that are not accessible.

To combat this trend, system designers have worked to keep these buses exposed. Thus the system components were built in a way that enabled the construction of prototyping systems with exposed buses. This approach is also under siege from the ever-increasing march of system clock rates. As the central processing unit (CPU) clock rates increase, chip to chip interface speeds are not keeping pace. Developers find that a partitioned system's performance does not keep pace with its integrated counterpart, due to interface wait states added to compensate for lagging chip to chip communication rates. At some point, this performance degradation reaches intolerable levels and the partitioned prototype system is no longer a viable debug option. In the current era production devices must serve as the platform for application development.

Increasing CPU clock rates are also limiting availability of other simple visibility mechanisms. Since the CPU clock rates can exceed the maximum I/O state rates, visibility ports exporting information in native form can no longer keep up with the CPU. On-chip subsystems are also operated at clock rates that are slower than the CPU clock rate. This approach may be used to simplify system design and reduce power consumption. These developments mean simple visibility ports can no longer be counted on to deliver a clear view of CPU activity. As visibility and control diminish, the development tools used to develop the application become less productive. The tools also appear harder to use due to the increasing tool complexity required to maintain visibility and control. The visibility, control, and ease of use issues created by systems-on-a-chip tend to lengthen product development cycles.

Even as the integration trends present developers with a tough debug environment, they also present hope that new approaches to debug problems will emerge. The increased densities and clock rates that create development cycle time pressures also create opportunities to solve them. On-chip, debug facilities are more affordable than ever before. As high speed, high performance chips are increasingly dominated by very large memory structures, the system cost associated with the random logic accompanying the CPU and memory subsystems is dropping as a percentage of total system cost. The incremental cost of several thousand gates is at an all time low. Circuits of this size may in some cases be tucked into a corner of today's chip designs. The incremental cost per pin in today's high density packages has also dropped. This makes it easy to allocate more pins for debug. The combination of affordable gates and pins enables the deployment of new, on-chip emulation facilities needed to address the challenges created by systems-on-a-chip.

When production devices also serve as the application debug platform, they must provide sufficient debug capabilities to support time to market objectives. Since debugging requirements vary with different applications, it is highly desirable to be able to adjust the on-chip debug facilities to balance time to market and cost needs. Since these on-chip capabilities affect the chip's recurring cost, the scalability of any solution is of primary importance. "Pay only for what you need" should be the guiding principle for on-chip tools deployment. In this new paradigm, the system architect may also specify the on-chip debug facilities along with the remainder of functionality, balancing chip cost constraints and the debug needs of the product development team.

FIG. 2 illustrates an emulator system 100 including four emulator components. These four components are: a debugger application program 110; a host computer 120; an emulation controller 130; and on-chip debug facilities 140. FIG. 2 illustrates the connections of these components. Host computer 120 is connected to an emulation controller 130 external to host 120. Emulation controller 130 is also connected to target system 140. The user preferably controls the target application on target system 140 through debugger application program 110.

Host computer 120 is generally a personal computer. Host computer 120 provides access the debug capabilities through emulator controller 130. Debugger application program 110 presents the debug capabilities in a user-friendly form via host computer 120. The debug resources are allocated by debug application program 110 on an as needed basis, relieving the user of this burden. Source level debug utilizes the debug resources, hiding their complexity from the user. Debugger application program 110 together with the on-chip trace and triggering facilities provide a means to select, record, and display chip activity of interest. Trace displays are automatically correlated to the source code that generated the trace log. The emulator provides both the debug control and trace recording function.

The debug facilities are preferably programmed using standard emulator debug accesses through a JTAG or similar serial debug interface. Since pins are at a premium, the preferred embodiment of the invention provides for the sharing of the debug pin pool by trace, trigger, and other debug functions with a small increment in silicon cost. Fixed pin formats may also be supported. When the pin sharing option is deployed, the debug pin utilization is determined at the beginning of each debug session before target system 140 is directed to run the application program. This maximizes the trace export bandwidth. Trace bandwidth is maximized by allocating the maximum number of pins to trace.

The debug capability and building blocks within a system may vary. Debugger application program 100 therefore establishes the configuration at runtime. This approach requires the hardware blocks to meet a set of constraints dealing with configuration and register organization. Other components provide a hardware search capability designed to locate the blocks and other peripherals in the system memory map. Debugger application program 110 uses a search facility to locate the resources. The address where the modules are located and a type ID uniquely identifies each block found. Once the IDs are found, a design database may be used to ascertain the exact configuration and all system inputs and outputs.

Host computer 120 generally includes at least 64 Mbytes of memory and is capable of running Windows 95, SR-2, Windows NT, or later versions of Windows. Host computer 120 must support one of the communications interfaces required by the emulator. These may include: Ethernet 10T and 100T, TCP/IP protocol; Universal Serial Bus (USB); Firewire IEEE 1394; and parallel port such as SPP, EPP and ECP.

Host computer 120 plays a major role in determining the real-time data exchange bandwidth. First, the host to emulator communication plays a major role in defining the maximum sustained real-time data exchange bandwidth because emulator controller 130 must empty its receive real-time data exchange buffers as fast as they are filled. Secondly, host computer 120 originating or receiving the real-time data exchange data must have sufficient processing capacity or disc bandwidth to sustain the preparation and transmission or processing and storing of the received real-time data exchange data. A state of the art personal computer with a Firewire communication channel (IEEE 1394) is preferred to obtain the highest real-time data exchange bandwidth. This bandwidth can be as much as ten times greater performance than other communication options.

Emulation controller 130 provides a bridge between host computer 120 and target system 140. Emulation controller 130 handles all debug information passed between debugger application program 110 running on host computer 120 and a target application executing on target system 140. A presently preferred minimum emulator configuration supports all of the following capabilities: real-time emulation; real-time data exchange; trace; and advanced analysis.

Emulation controller 130 preferably accesses real-time emulation capabilities such as execution control, memory, and register access via a 3, 4, or 5 bit scan based interface. Real-time data exchange capabilities can be accessed by scan or by using three higher bandwidth real-time data exchange formats that use direct target to emulator connections other than scan. The input and output triggers allow other system components to signal the chip with debug events and vice-versa. Bit I/O allows the emulator to stimulate or monitor system inputs and outputs. Bit I/O can be used to support factory test and other low bandwidth, non-time-critical emulator/target operations. Extended operating modes are used to specify device test and emulation operating modes. Emulator controller 130 is partitioned into communication and emulation sections. The communication section supports host communication links while the emulation section interfaces to the target, managing target debug functions and the device debug port. Emulation controller 130 communicates with host computer 120 using one of industry standard communication links outlined earlier herein. The host to emulator connection is established with off the shelf cabling technology. Host to emulator separation is governed by the standards applied to the interface used.

Emulation controller 130 communicates with the target system 140 through a target cable or cables. Debug, trace, triggers, and real-time data exchange capabilities share the target cable, and in some cases, the same device pins. More than one target cable may be required when the target system 140 deploys a trace width that cannot be accommodated in a single cable. All trace, real-time data exchange, and debug communication occurs over this link. Emulator controller 130 preferably allows for a target to emulator separation of at least two feet. This emulation technology is capable of test clock rates up to 50 MHZ and trace clock rates from 200 to 300 MHZ, or higher. Even though the emulator design uses techniques that should relax target system 140 constraints, signaling between emulator controller 130 and target system 140 at these rates requires design diligence. This emulation technology may impose restrictions on the placement of chip debug pins, board layout, and requires precise pin timings. On-chip pin macros are provided to assist in meeting timing constraints.

The on-chip debug facilities offer the developer a rich set of development capability in a two tiered, scalable approach. The first tier delivers functionality utilizing the real-time emulation capability built into a CPU's mega-modules. This real-time emulation capability has fixed functionality and is permanently part of the CPU while the high performance real-time data exchange, advanced analysis, and trace functions are added outside of the core in most cases. The capabilities are individually selected for addition to a chip. The addition of emulation peripherals to the system design creates the second tier functionality. A cost-effective library of emulation peripherals contains the building blocks to create systems and permits the construction of advanced analysis, high performance real-time data exchange, and trace capabilities. In the preferred embodiment five standard debug configurations are offered, although custom configurations are also supported. The specific configurations are covered later herein.

SUMMARY OF THE INVENTION

This invention is applicable to a data processor having a multistage instruction pipeline. An instruction or piece of data advances one architectural stage in the processor pipeline every clock cycle unless the pipeline is stalled.

Alignment of pipeline data in a processor is accomplished if all required data provided to or produced by a processor instruction is presented as a group of data in the same clock cycle. The amount and sources of required data varies depending on the needs and goals of the implementation.

This invention allows correct capture of read data under any pipeline stall condition and corrects N-bit sliding of memory data in case the memory access slides data due to an odd bank transaction.

BRIEF DESCRIPTION OF THE DRAWINGS

These and other aspects of this invention are illustrated in the drawings, in which.

DETAILED DESCRIPTION OF PREFERRED EMBODIMENTS

The problem solved by this invention is the potential lost of memory read data from a processor's pipeline that occurs in cases when the read data at the collection stage is overwritten due to read data sliding from the previous pipeline stage during the first cycle of a pipeline stall window. Some processor architectures obtain higher performance by using an even/odd memory access scheme for their load and store instructions. This generally results in an N-bit sliding of the memory data when the memory location being accessed is odd. In some other cases when the general purpose register being used is in an odd bank in the register file, the even/odd scheme is used in the load and store instructions. This reordering of the placement of the data is necessary to preserve the architectural view of the data.

The invention solves the problem of the lost of read data is solved by capturing it during active pipeline cycles except the first cycle after a pipeline stall window. The invention also captures the read data during the first cycle in a pipeline stall window. The N-bit sliding problem is solved by applying an N-bit slide correction to the write and read data after both pieces of data have been architecturally generated and properly captured and collected.

Figure 3:
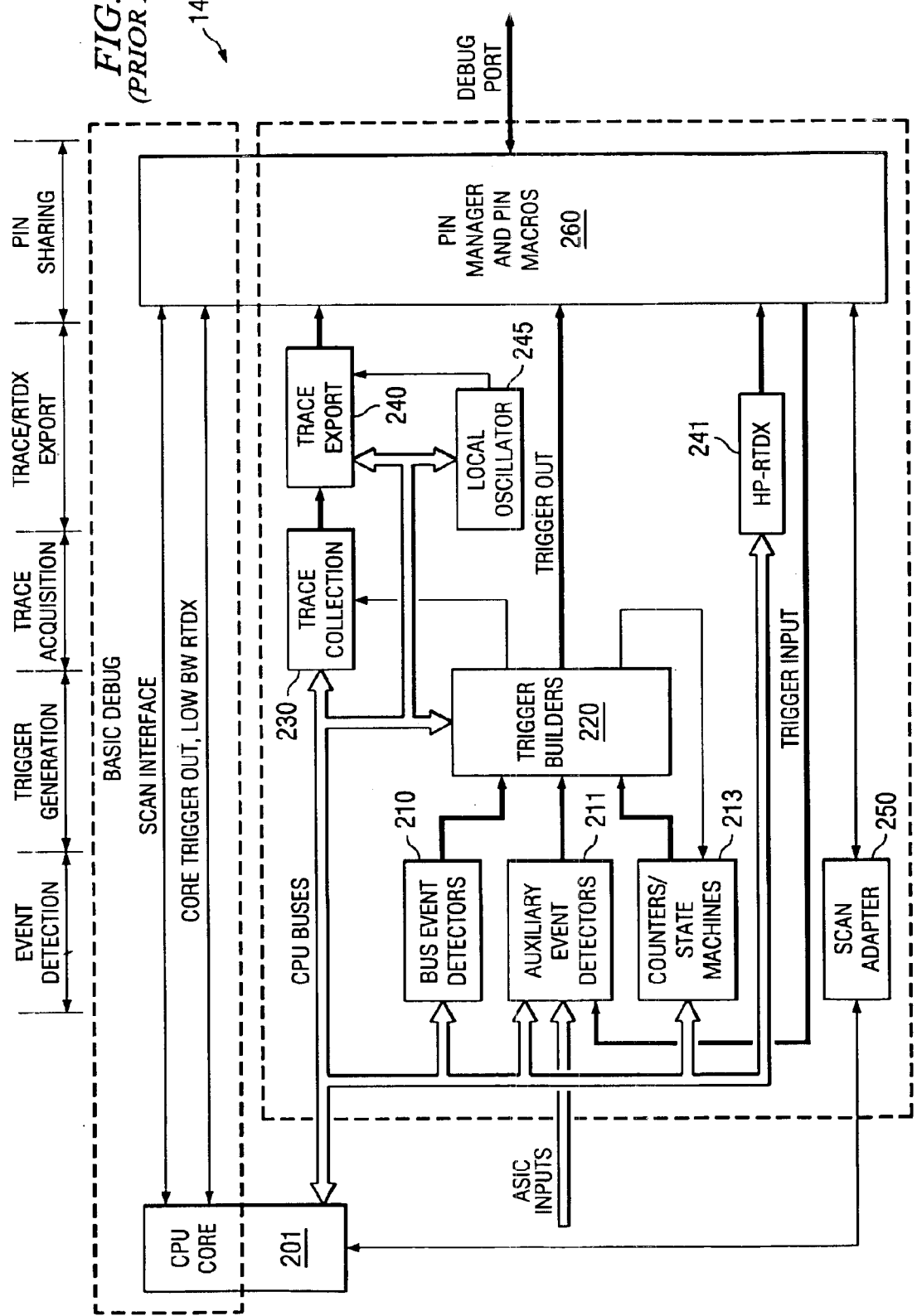
FIG. 3 illustrates in block diagram form a typical integrated circuit employing configurable emulation capability.

FIG. 3 illustrates an example of one on-chip debug architecture embodying target system 140. The architecture uses several module classes to create the debug function. One of these classes is event detectors including bus event detectors 210, auxiliary event detectors 211 and counters/state machines 213. A second class of modules is trigger generators including trigger builders 220. A third class of modules is data acquisition including trace collection 230 and formatting. A fourth class of modules is data export including trace export 240, and real-time data exchange export 241. Trace export 240 is controlled by clock signals from local oscillator 245. Local oscillator 245 will be described in detail below. A final class of modules is scan adaptor 250, which interfaces scan input/output to CPU core 201. Final data formatting and pin selection occurs in pin manager and pin micros 260.

The size of the debug function and its associated capabilities for any particular embodiment of a system-on-chip may be adjusted by either deleting complete functions or limiting the number of event detectors and trigger builders deployed. Additionally, the trace function can be incrementally increased from program counter trace only to program counter and data trace along with ASIC and CPU generated data. The real-time data exchange function may also be optionally deployed. The ability to customize on-chip tools changes the application development paradigm. Historically, all chip designs with a given CPU core were limited to a fixed set of debug capability. Now, an optimized debug capability is available for each chip design. This paradigm change gives system architects the tools needed to manage product development risk at an affordable cost. Note that the same CPU core may be used with differing peripherals with differing pin outs to embody differing system-on-chip products. These differing embodiments may require differing debug and emulation resources. The modularity of this invention permits each such embodiment to include only the necessary debug and emulation resources for the particular system-on-chip application.

The real-time emulation debug infrastructure component is used to tackle basic debug and instrumentation operations related to application development. It contains all execution control and register visibility capabilities and a minimal set of real-time data exchange and analysis such as breakpoint and watchpoint capabilities. These debug operations use on-chip hardware facilities to control the execution of the application and gain access to registers and memory. Some of the debug operations which may be supported by real-time emulation are: setting a software breakpoint and observing the machine state at that point; single step code advance to observe exact instruction by instruction decision making; detecting a spurious write to a known memory location; and viewing and changing memory and peripheral registers.

Real-time emulation facilities are incorporated into a CPU mega-module and are woven into the fabric of CPU core 201. This assures designs using CPU core 201 have sufficient debug facilities to support debugger application program 110 baseline debug, instrumentation, and data transfer capabilities. Each CPU core 201 incorporates a baseline set of emulation capabilities. These capabilities include but are not limited to: execution control such as run, single instruction step, halt and free run; displaying and modifying registers and memory; breakpoints including software and minimal hardware program breakpoints; and watchpoints including minimal hardware data breakpoints.

Figure 1:
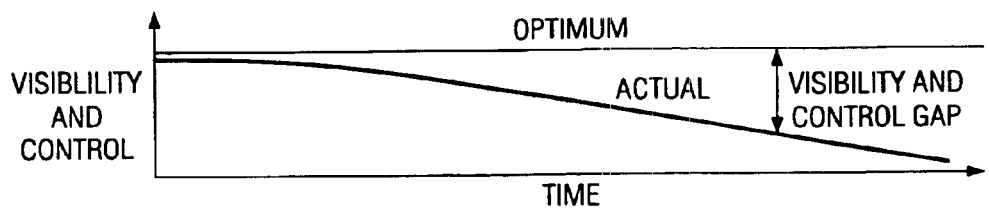
FIG. 1 illustrates the visibility and control of typical integrated circuits as a function of time due to increasing system integration.
Figure 2:
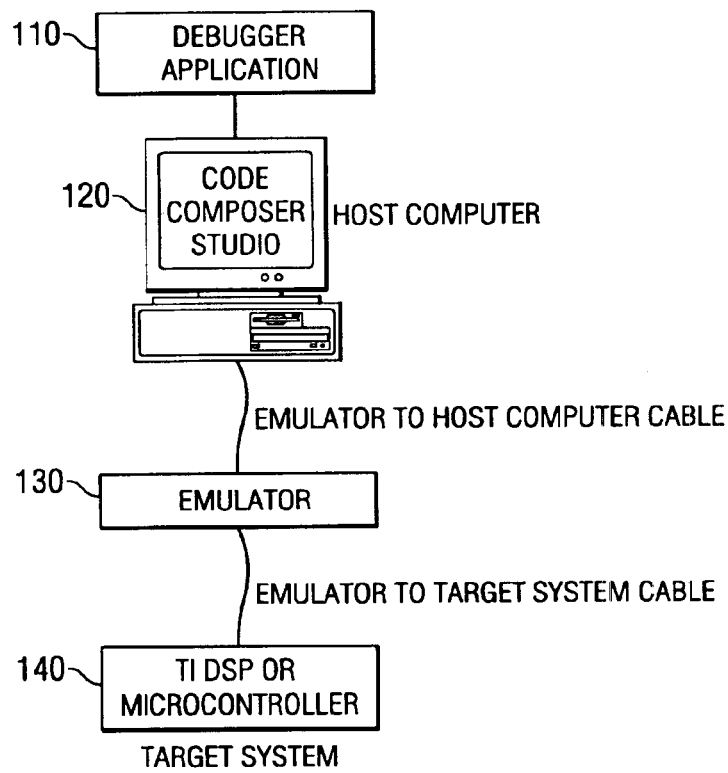
FIG. 2 illustrates an emulation system to which this invention is applicable.
Figure 4:
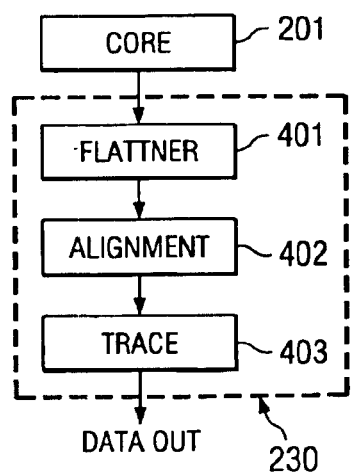
FIG. 4 illustrates in block diagram form a detail of the trace collection hardware according to this invention.

FIG. 4 illustrates a detail of trace collection 230. Trace collection 230 hardware gets new trace data from the CPU core 201 every cycle. This trace comes form different pipeline stages of CPU core 201. Pipeline flattener 401 combines all data from different clock cycles within the instruction pipeline that correspond to the same instruction. The data for each instruction is complete at the output of pipeline flattener 401. Alignment logic 402 aligns the data coming from other parts of the emulation logic with the output of pipeline flattener 401. This data then goes to trace logic 403.

Figure 5:
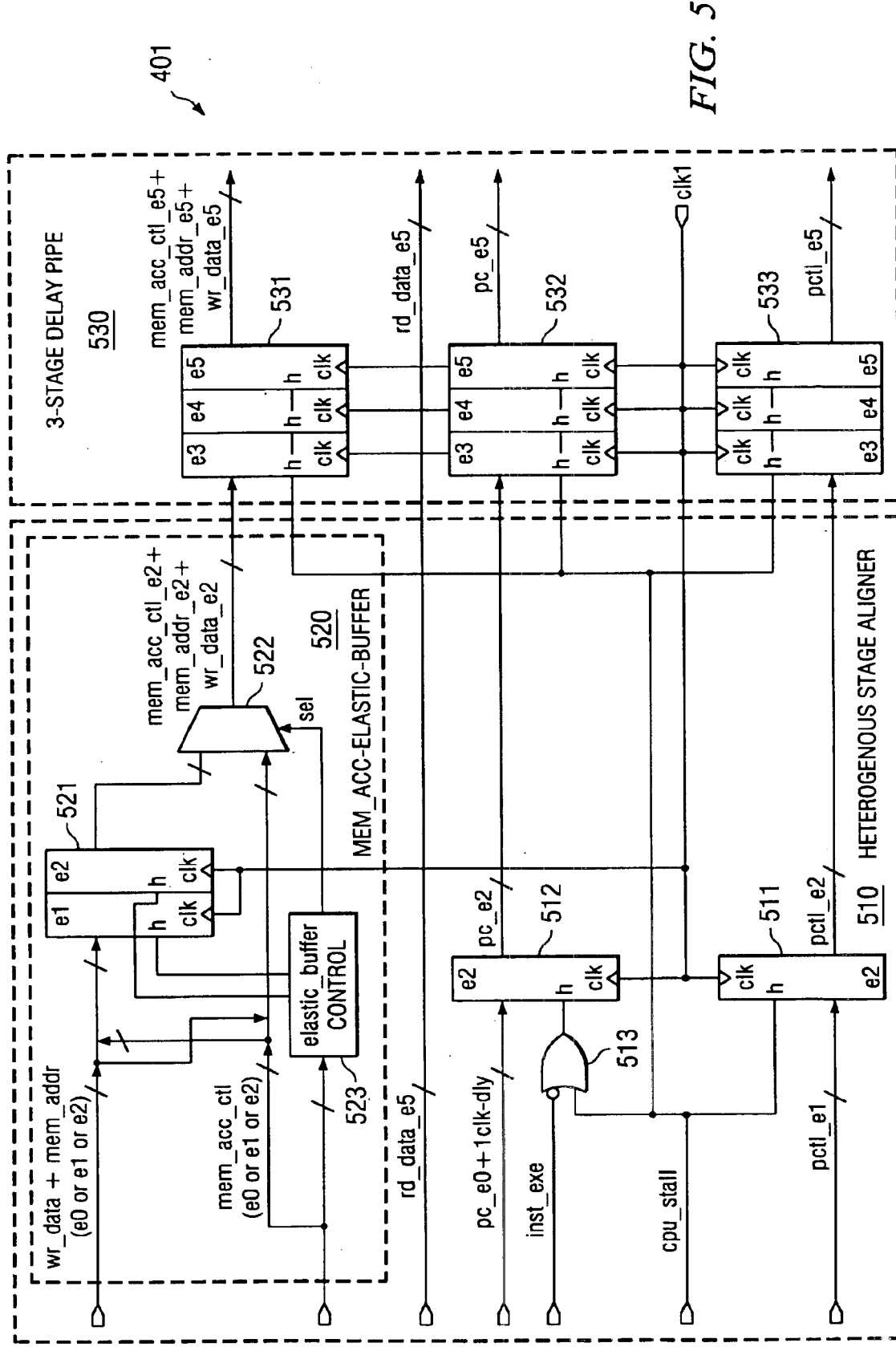
FIG. 5 illustrates in block diagram form the pipeline flattener of this invention.

FIG. 5 illustrates the pipeline flattener 401 of this invention. Pipeline flattener 401 achieves alignment of program counter (pc), pipeline-flow control information (pctl), memory access control (mem_acc_ctl), memory access address (mem_addr), memory access write data (wr_data) and memory access read data (rd_data).

Alignment is implemented in 2 steps. First, the data collected in early stages of the pipeline is aligned in a per case bases in order to account for the differences in the data collection behavior. This presents a simpler group of data to the second processing step. Heterogeneous stage aligner 510 performs this initial alignment step. Second, the data collected in the first step presents a single type of behavior. The 3-stage delay pipeline 530 aligns this data from the first stage as a group to the last arriving memory access read data (rd_data).

The point of collection of the last arriving memory access read data (rd_data) is the target point of alignment. In this example this point of collection is stage 5 of the pipeline (e5). As a first step towards the final alignment goal, the early arriving data is processed in various ways and aligned via heterogeneous stage aligner 510 to the second stage of the pipeline (e2). In order to be considered fully aligned to e2, the data should not be updated at the beginning of the clock cycle if the pipeline did not advance in the previous cycle. This is indicated by cpu_stall=1 in previous cycle. For the example illustrated in FIG. 5 there are 5 sources of early arriving data program counter (pc), pipeline-flow control information (pctl), memory access control (mem_acc_ctl), memory access address (mem_addr) and memory access write data (wr_data). These represent 3 independent data retention policies and require 3 different mechanisms in order to be aligned to pipeline state e2 as a group.

The pipeline-flow control information (pctl) data group is collected in pipeline stage e1. This data has a data retention policy similar to the policy of any stage in the architectural pipeline. Thus all that is required to align pipeline-flow control information (pctl) to pipeline stage e2 is the single stage pipeline delay element 511. Pipeline delay element 511 is implemented by a single register stage that updates when the pipeline advances (cpu_stall=0).

A second set of early collected data is the program counter (pc). The program counter is generated in pipeline stage e0. The program counter is delayed 1 clock cycle via a single register stage (not shown) and then presented at the input of heterogeneous stage aligner 510 as the signal pc_e0+1 clock delay. Program counter (pc) data is aligned to pipeline stage e2 via a single register stage in pipeline delay element 512. Pipeline delay element 512 updates only when the pipeline advances (cpu_stall=0) and only if the current instruction in pipeline state e1 is a new instruction (inst_exe=1). OR gate 513 advances receives the cpu_stall signal and the inst_exe signal and insures pipeline delay element 512 advances only under these conditions. Enforcing these 2 conditions ensures that the aligned program counter (pc) value in pipeline stage e2 during multicycle instructions remains the same during all the cycles it takes to execute the instruction. This retention is in spite of the fact that the program counter (pc) retention policy will overwrite the program counter (pc) value presented after the first clock cycle of the instruction in pipeline stage e1.

The three remaining sets of early collected data are related to memory accesses. These are memory access control (mem_acc_ctl), memory access address (mem_addr) and memory access write data (wr_data). For the particular implementation illustrated in FIG. 5, the three sources of data have a similar data retention policy and are collected in the same pipeline stages. Thus the same mechanism is used in order to align them to pipeline state e2. These 3 pieces of data are architecturally generated in pipeline stage e2. However, due to some special needs of this particular implementation there are a few exceptional cases where the memory access data is collected in pipeline stages e1 and e0 rather than pipeline stage e2.

Memory access elastic buffer 520 copes with these alternatives. Received memory access control data (mem_acc_ctl) supplies the input to two stage pipeline delay element 521, the input to multiplexer 522 and an input to elastic buffer control 523. The memory access address (mem_addr) and memory access write data (wr_data) supply the input to pipeline delay element 521 and multiplexer 522. It should be understood that the memory access control data (mem_acc_ctl), the memory access address (mem_addr) and memory access write data (wr_data) are handled in parallel in pipeline delay element 521 and multiplexer 522.

The memory access control data (mem_acc_ctl) indicates the pipeline stage of collection of the memory access signals. Elastic buffer control 523 uses this indication to control pipeline delay element 521 and multiplexer 522. If the memory access data was collected during pipeline stage e2, then elastic buffer control 523 sends a select signal to multiplexer 522 to select the directly received memory access signals. If the memory access data was collected during pipeline stage e1, then elastic buffer control 523 sends a select signal to multiplexer 522 to select memory access signals from pipeline delay element 521. Elastic buffer control 523 also controls pipeline delay element 521 to insert one pipeline stage delay. If the memory access data was collected during pipeline stage e0, then elastic buffer control 523 sends a select signal to multiplexer 522 to select memory access signals from pipeline delay element 521. Elastic buffer control 523 also controls pipeline delay element 521 to insert two pipeline stage delays. This behavior is summarized in Table 1.

TABLE 1

| Data collected | Multiplexer 522 select | Pipeline delay element 521 |
|---|---|---|
| e0 | delayed data | 2 stage delay |
| e1 | delayed data | 1 stage delay |
| e2 | direct data | — |

The 3-stage delay pipeline 530 takes the homogeneously behaved data at its input already aligned to the second pipeline stage e2. Three-stage delay pipeline 530 includes pipeline delay element 531 for the memory access data, pipeline delay element 532 for the program counter data and pipeline delay element 533 for the pipeline-flow control information. Three-stage delay pipeline 530 outputs this data at pipeline stage e5. This is the same stage as the arrival of the read data (rd_data). Three-stage delay pipeline 530 sends every bit of input data through 3 serially connected registers that update its content every clock cycles that the pipeline is not stalled (cpu_stall=0). The clock signal clk1 is supplied to pipeline delay elements 511 and 512 and to every register of pipeline delay elements 521, 531, 532 and 533. The cpu_stall signal stalls pipeline delay elements 511, 512, 531, 532 and 533 when the central processing unit is stalled. Since the memory access data is not updated by heterogeneous stage aligner 510 during pipeline stall cycles, no data is lost during pipeline stalls. Pipeline flattener 501 effectively aligns the program counter (pc), pipeline-flow control information (pctl), memory access control (mem_acc_ctl), memory access address (mem_addr), memory access write data (wr_data) to the late received read data (rd_data) in pipeline stage e5.

Figure 6:
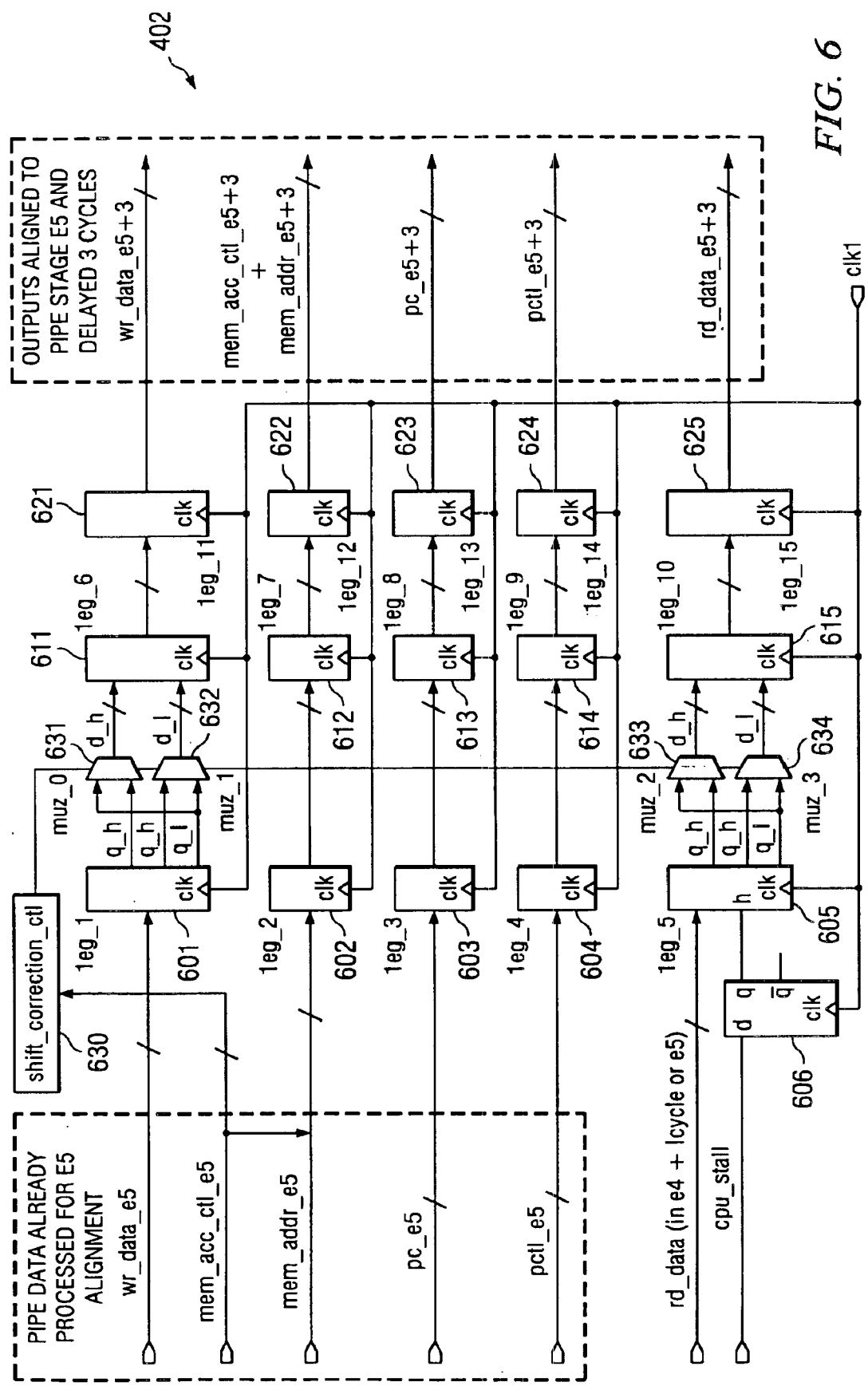
FIG. 6 illustrates in block diagram form one embodiment of the sliding alignment correction circuit of this invention.

FIG. 6 illustrates alignment circuit 402 in one embodiment of this invention. The data presented at the input of this circuit is aligned to the cycle and pipeline stage where the last set of data, the memory access read data (rd_data), becomes available. In this example the data processor has a five stage pipeline. Thus the write data (wr_data_e5), memory access control data (mem_acc_ctl_e5), memory address (mem_addr_e5), program counter (pc_e5) and pipeline-flow control information (pctl_e5) has been aligned with the late arriving read data (rd_data) in pipeline stage e5.

In FIG. 6 although all the data presented at the input of the circuit is be aligned to pipeline stage e5, there is an issue with 1 clock cycle sliding of read data (rd_data) that could cause it not to be correctly captured if the pipeline stalls. The 1 clock cycle sliding of read data (rd_data) happens when the read data (rd_data) presented at the input boundary of the circuit as it updates one more cycle once the pipeline stalls. As part of this behavior the same source of read data (rd_data) will not be updated like the rest of the aligned data at the beginning of the second pipeline advance cycle after the stall. In other words the 1 cycle sliding of the read data (rd_data) could be described as a 1 cycle delay on response to the stall or advance taking place in the pipeline.

In order to prevent the potential lost of the read data, additional registering stage is inserted in the path of the data. This one pipeline stage delay is implemented via pipeline delay elements 601, 602, 603, 604 and 605. The pipeline delay element 605 provides storage to capture the read data (rd_data) and eliminates the loss of read data associated with the instruction in pipeline state e5 being overwritten when the read data in pipeline stage e4 slides into pipeline stage e5 during the first cycle of a CPU stall window. Pipeline delay elements 601, 602, 603 and 604 do not hold data and have been added as delay elements to compensate for the delay of pipeline delay register 605, which captures and holds the read data. In order to remove the 1 clock slide in the read data, the hold signal supplied to pipeline delay register 605 is a 1 clock delayed version of the pipeline stall signal (cpu_stall) provided by delay element 606.

FIG. 6 illustrates two additional register stages in each data path: pipeline delay elements 611 and 621 in the write data path, pipeline delay elements 612 and 622 in the memory access control data and the memory address paths; pipeline delay elements 613 and 624 in the program counter path; pipeline delay elements 614 and 624 in the pipeline-flow control information path; and pipeline delay elements 615 and 625 in the read data path. These two additional stages add additional latency specific to this implementation of the preferred embodiment of the invention. The 3 additional register stages alignment circuit 602 do not represent additional pipeline stages, they only add clock latency to the implementation. The data at the output of alignment circuit 602 is the contents of pipeline stage e5 in the pipeline delayed by 3 clock cycles.

The correction to the N-bit sliding on the memory data is done via an N-bit slide operation in the opposite direction to the slide of the data. The data bus is assumed to be 2 words wide in this embodiment. The sliding of data at the input is limited to a swapping between the upper and lower words of the bus. Shift correction circuit 630 receives the memory access control signal and detects the sliding condition. Shift correction circuit 630 controls multiplexers 631, 632, 633, and 634 to enable or disable a swap of the most significant and least significant bits. In order to restore the architectural view of the data it is necessary to align the least significant bits of the write data and the read data to the least significant bits of the data bus. On a normal state of the multiplexer control signal from shift control circuit 630 multiplexer 631 selects the most significant bits from pipeline delay element 601 to output to the most significant bits of pipeline delay element 611, multiplexer 632 selects the least significant bits from pipeline delay element 601 output to the least significant bits of pipeline delay element 611, multiplexer 633 selects the most significant bits from pipeline delay element 605 to output to the most significant bits of pipeline delay element 615, multiplexer 634 selects the least significant bits from pipeline delay element 605 output to the least significant bits of pipeline delay element 611. In the opposite swap state multiplexer 631 selects the least significant bits from pipeline delay element 601 to output to the most significant bits of pipeline delay element 611, multiplexer 632 selects the most significant bits from pipeline delay element 601 output to the least significant bits of pipeline delay element 611, multiplexer 633 selects the least significant bits from pipeline delay element 605 to output to the most significant bits of pipeline delay element 615, multiplexer 634 selects the most significant bits from pipeline delay element 605 output to the least significant bits of pipeline delay element 611. This swaps the most significant bits with the least significant bits of both the write data and the read data.

Figure 7:
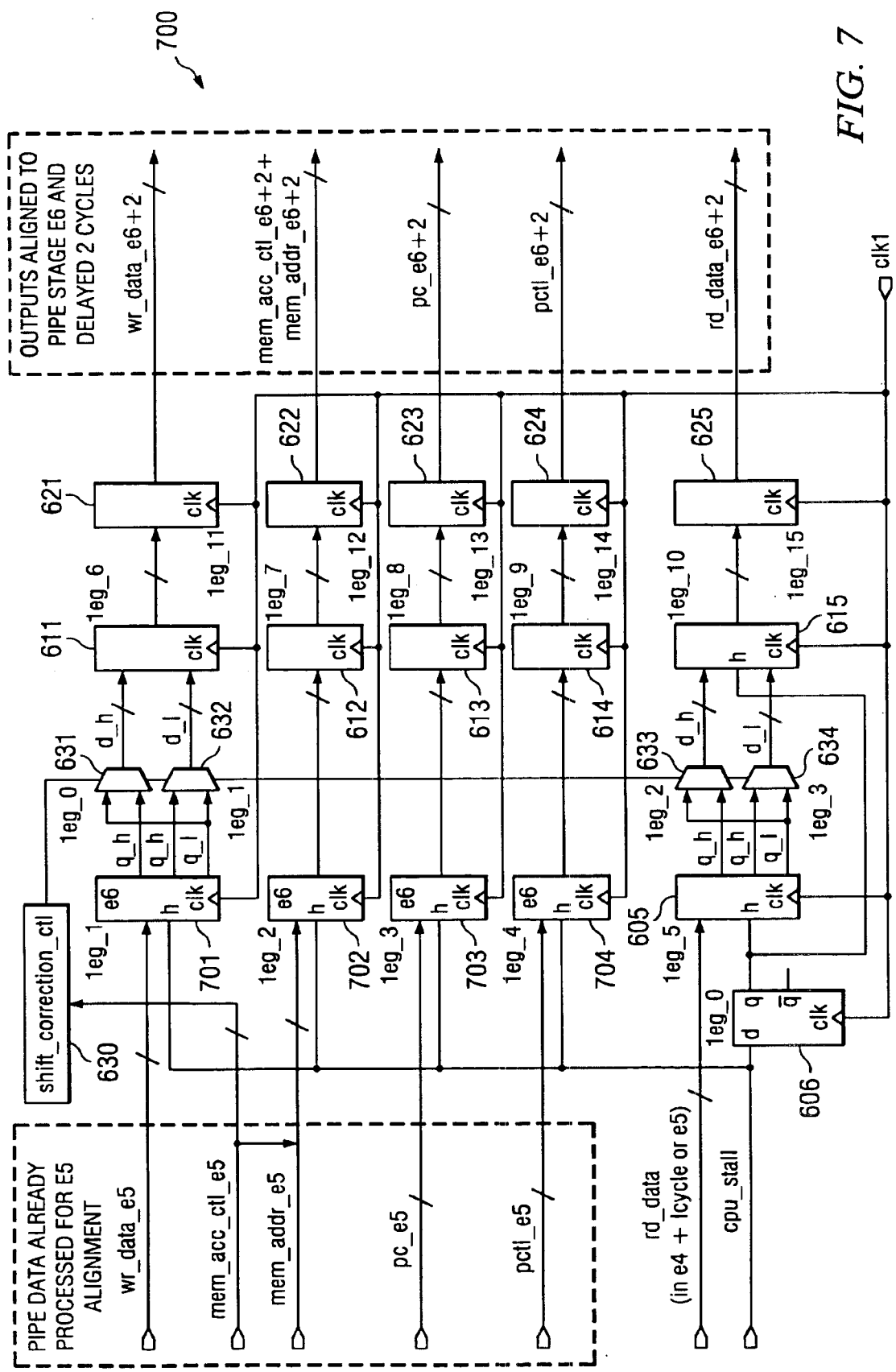
FIG. 7 illustrates in block diagram form an alternative embodiment of the sliding alignment correction circuit of this invention.

FIG. 7 illustrates adjustment circuit 700 in an alternative embodiment of this invention. In this alternative clock delay elements 401, 402, 403, 404 and 415 are replaced with respective pipeline delays elements 701, 702, 703, 704 and 715. An additional pipeline delay has been added by holding the contents of pipeline delay elements 701, 702, 703, 704 and 715 by connecting their hold inputs to the cpu_stall signal. As a result the pipeline data aligned to pipeline stage e5 presented as input of adjustment circuit 700 will require that the pipeline advances one more stage to pipeline stage e6, before it could be propagated via 2 stages of latency to the output.

What is claimed is:

1. A method for trace data alignment in a processor having an instruction pipeline comprising the steps of:

delaying write data a predetermined number of clock cycles;

selectively swapping most significant write data and least significant write data dependent upon memory access control data;

delaying read data the predetermined number of clock cycles; and selectively swapping most significant read data and least significant read data dependent upon memory access control data, wherein:

said steps selectively swapping write data selectively swapping read data swap the write data and read data when the memory access control data indicates memory access to an odd memory bank.

2. The method for trace data alignment of claim 1, wherein:

said step of delaying read data further includes holding the read data if the pipeline stalls.

3. The method for trace data alignment of claim 2, wherein:

said step of holding the read data if the pipeline stalls is implemented in a pipeline register having a hold input receiving a stall signal delayed by one clock cycle.

4. The method for trace data alignment of claim 2, further comprising the steps of:

delaying memory access control data the predetermined number of clock cycles;

delaying program counter data the predetermined number of clock cycles; and delaying program counter control data the predetermined number of clock cycles.

5. The method for trace data alignment of claim 4, wherein:

said step of delaying write data further includes holding the write data if the pipeline stalls;

said step of delaying memory access control data further includes holding the memory access control data if the pipeline stalls;

said step of delaying program counter data further includes holding the program counter data if the pipeline stalls;

said step of delaying program counter control data further includes holding the program counter control data if the pipeline stalls; and said step of delaying read data further includes holding the read data if the pipeline stalls.

6. An apparatus for trace data alignment in a processor having an instruction pipeline comprising:

a predetermined number of cascade write data clock delay registers having an input receiving write data and an output delayed the predetermined number of clock cycles;

a first multiplexer having a first input receiving most significant bits from one of said cascade write data clock delay registers, a second input receiving least significant bits from said one of said cascade write data clock delay registers, a control input and an output supplying a selected one of the first input or the second input to most significant bit input of a next cascade write data clock delay register dependent upon a signal at said control input;

a second multiplexer having a first input receiving least significant bits from said one of said cascade write data clock delay registers, a second input receiving most significant bits from said one of said cascade write data clock delay registers, a control input and an output supplying a selected one of the first input or the second input to least significant bit input of a next cascade write data clock delay register dependent upon a signal at said control input;

said predetermined number of cascade read data clock delay registers having an input receiving read data and an output delayed the predetermined number of clock cycles;

a third multiplexer having a first input receiving most significant bits from one of said cascade read data clock delay registers, a second input receiving least significant bits from said one of said cascade read data clock delay registers, a control input and an output supplying a selected one of the first input or the second input to most significant bit input of a next cascade read data clock delay register dependent upon a signal at said control input;

a fourth multiplexer having a first input receiving least significant bits from said one of said cascade read data clock delay registers, a second input receiving most significant bits from said one of said cascade read data clock delay registers, a control input and an output supplying a selected one of the first input or the second input to least significant bit input of a next cascade read data clock delay register dependent upon a signal at said control input; and a shift correction circuit having an input receiving memory access control data and an output connected to said control inputs of said first, second, third and fourth multiplexers controlling said selection of said first, second, third and fourth multiplexers.

7. The apparatus for trace data alignment of claim 6, wherein:

said shift correction circuit generates said output causing said first, second, third and fourth multiplexers to select respective first inputs if said memory access control data indicates a memory access to an even memory bank and causing said first, second, third and fourth multiplexers to select respective second inputs if said memory access control data indicates a memory access to an odd memory bank.

8. The apparatus for trace data alignment of claim 6, wherein:

a first cascade read clock delay register includes a hold input receiving a stall signal for holding said read data if the pipeline stalls.

9. The apparatus for trace data alignment of claim 6, further comprising:

a stall delay register having an input receiving said stall and an output connected to said first cascade read clock delay register hold input delayed by one clock cycle.

10. The apparatus for trace data alignment of claim 6, further comprising:

the predetermined number of cascade memory access control data clock delay registers having an input receiving memory access control data and an output delayed the predetermined number of clock cycles;

the predetermined number of cascade program counter data clock delay registers having an input receiving program counter data and an output delayed the predetermined number of clock cycles; and the predetermined number of cascade program counter control data clock delay registers having an input receiving program counter control data and an output delayed the predetermined number of clock cycles.

11. The apparatus for trace data alignment of claim 10, wherein:

a first cascade write data clock delay register includes a hold input receiving a stall signal for holding said write data if the pipeline stalls;

a first cascade memory access control data clock delay register includes a hold input receiving a stall signal for holding said memory access control data if the pipeline stalls;

a first cascade program counter data clock delay register includes a hold input receiving said stall signal for holding said program counter data if the pipeline stalls;

a first cascade program counter control clock delay register includes a hold input receiving a stall signal for holding said program counter control data if the pipeline stalls; and a first and a second cascade read clock delay register each include a hold input receiving a stall signal for holding said read data if the pipeline stalls.

* * * * *